US012062214B2

(12) United States Patent
Tsakok (10) Patent No.: US 12,062,214 B2
(45) Date of Patent: Aug. 13, 2024

(54) SYSTEMS AND METHOD FOR GENERATING MORTON CODE (71) Applicant: Advanced Micro Devices, Inc., Santa Clara, CA (US)

(72) Inventor: John Alexandre Tsakok, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 311 days.

(21) Appl. No.: 17/562,842

(22) Filed: Dec. 27, 2021

(65) Prior Publication Data

US 2023/0206509 A1 Jun. 29, 2023

(51) Int. Cl.
*G06T 9/00* (2006.01)
*G06T 9/20* (2006.01)

(52) U.S. Cl.
CPC ............. *G06T 9/001* (2013.01); *G06T 9/20* (2013.01)

(58) Field of Classification Search
None
See application file for complete search history.

(56) References Cited

U.S. PATENT DOCUMENTS

| | | | | |
|---|---|---|---|---|
| 9,772,849 B2* | 9/2017 | Evans | ................ | G06F 9/30018 |
| 9,998,726 B2* | 6/2018 | Rusanovskyy | ...... | H04N 13/161 |
| 10,863,170 B2* | 12/2020 | Rusanovskyy | ........ | H04N 19/30 |
| 2014/0301463 A1* | 10/2014 | Rusanovskyy | ........ | H04N 19/52 |
| | | | | 375/240.16 |
| 2016/0139929 A1* | 5/2016 | Evans | ................ | G06F 9/30196 |
| | | | | 712/208 |
| 2016/0139930 A1* | 5/2016 | Evans | ................ | G06F 9/30025 |
| | | | | 712/208 |
| 2016/0139931 A1* | 5/2016 | Evans | ................ | G06F 9/30145 |
| | | | | 712/208 |
| 2021/0150201 A1* | 5/2021 | Reisswig | ................... | G06T 7/70 |
| 2022/0051467 A1* | 2/2022 | Woop | ..................... | G06T 15/06 |
| 2022/0124371 A1* | 4/2022 | Zhang | ................ | H04N 19/176 |
| 2022/0329858 A1* | 10/2022 | Zhang | ................ | H04N 19/597 |

OTHER PUBLICATIONS

Vinkler, M., et. al., "Extended Morton Codes for High Performance Bounding Volume Hierarchy Construction", Proceedings of HPG '17, Jul. 2017, 8 pgs.

* cited by examiner

*Primary Examiner* — Anand P Bhatnagar
(74) *Attorney, Agent, or Firm* — Volpe Koenig (57) ABSTRACT Methods and systems are disclosed for encoding a Morton code. Techniques disclosed comprise receiving location vectors associated with primitives, where the primitives are graphical elements spatially located within a three-dimensional scene. Techniques further comprise determining a code pattern comprising a prefix pattern and a base pattern, and, then, coding each of the location vectors according to the code pattern.

20 Claims, 6 Drawing Sheets

SYSTEMS AND METHOD FOR GENERATING MORTON CODE

CROSS REFERENCE TO RELATED APPLICATION

U.S. patent application Ser. No. 17/562,271, filed Dec. 27, 2021, titled "BVH node ordering for efficient ray tracing," is hereby incorporated by reference herein by its entirety.

BACKGROUND

Systems of computer graphics are developed to render objects, represented by a large number of graphical elements (primitives), that are part of rapidly changing scenes. High quality rendering of these objects typically involves tracing rays that propagate across the primitives of the scene. Ray tracing can be used to add effects, accounting for physical properties that affect the interaction of the rendered objects with light sources at the scene. Efficient ray tracing techniques rely, in turn, on acceleration structures, such as bounding volume hierarchy (BVH) trees, that represent the scene's primitives in a hierarchical manner. A common way to construct a BVH tree is by utilizing a Morton code.

BRIEF DESCRIPTION OF THE DRAWINGS

A more detailed understanding may be had from the following description, given by way of example in conjunction with the accompanying drawings wherein.

DETAILED DESCRIPTION

System and methods are disclosed in the present application for generating Morton codes, by an encoder. The Morton code encoder, disclosed herein, utilizes a variable coding pattern to code location vectors of primitives that represent a three-dimensional (3D) scene to be rendered. The coding pattern can be one of two selectable variations that are determined based on a prefix pattern and a base pattern. Further improvement is presented by inserting the size of a primitive into its respective Morton code, wherein the normalization of the size of a primitive is not based on the scene size. The coding patterns and the normalization of primitives' size, as disclosed herein, provide a faster method for generating Morton codes and a higher quality clustering of primitives based on the resulting Morton codes, relative to proposed methods (e.g., see M. Vinkler et al. Extended Morton Codes for High Performance Bounding Volume Hierarchy Construction, Proceedings of HPG '17, Jul. 28-30, 2017, hereafter referred to as Vinkler).

Aspects disclosed in the present disclosure describe methods for encoding a Morton code, by an encoder. The methods include receiving location vectors associated with primitives, the primitives are graphical elements spatially located within a 3D scene; determining a code pattern comprising a prefix pattern and a base pattern; and coding each of the location vectors according to the code pattern.

Aspects disclosed in the present disclosure also describe systems for encoding a Morton code, comprising at least one processor and memory storing instructions. The instructions, when executed by the at least one processor, cause the systems to receive location vectors associated with primitives, the primitives are graphical elements spatially located within 3D scene, to determine a code pattern comprising a prefix pattern and a base pattern, and to code each of the location vectors according to the code pattern.

Further, aspects disclosed in the present disclosure describe a non-transitory computer-readable medium comprising instructions executable by at least one processor to perform methods for encoding a Morton code by an encoder. The methods comprise receiving location vectors associated with primitives, the primitives are graphical elements spatially located within a 3D scene; determining a code pattern comprising a prefix pattern and a base pattern; and coding each of the location vectors according to the code pattern.

Figure 1:
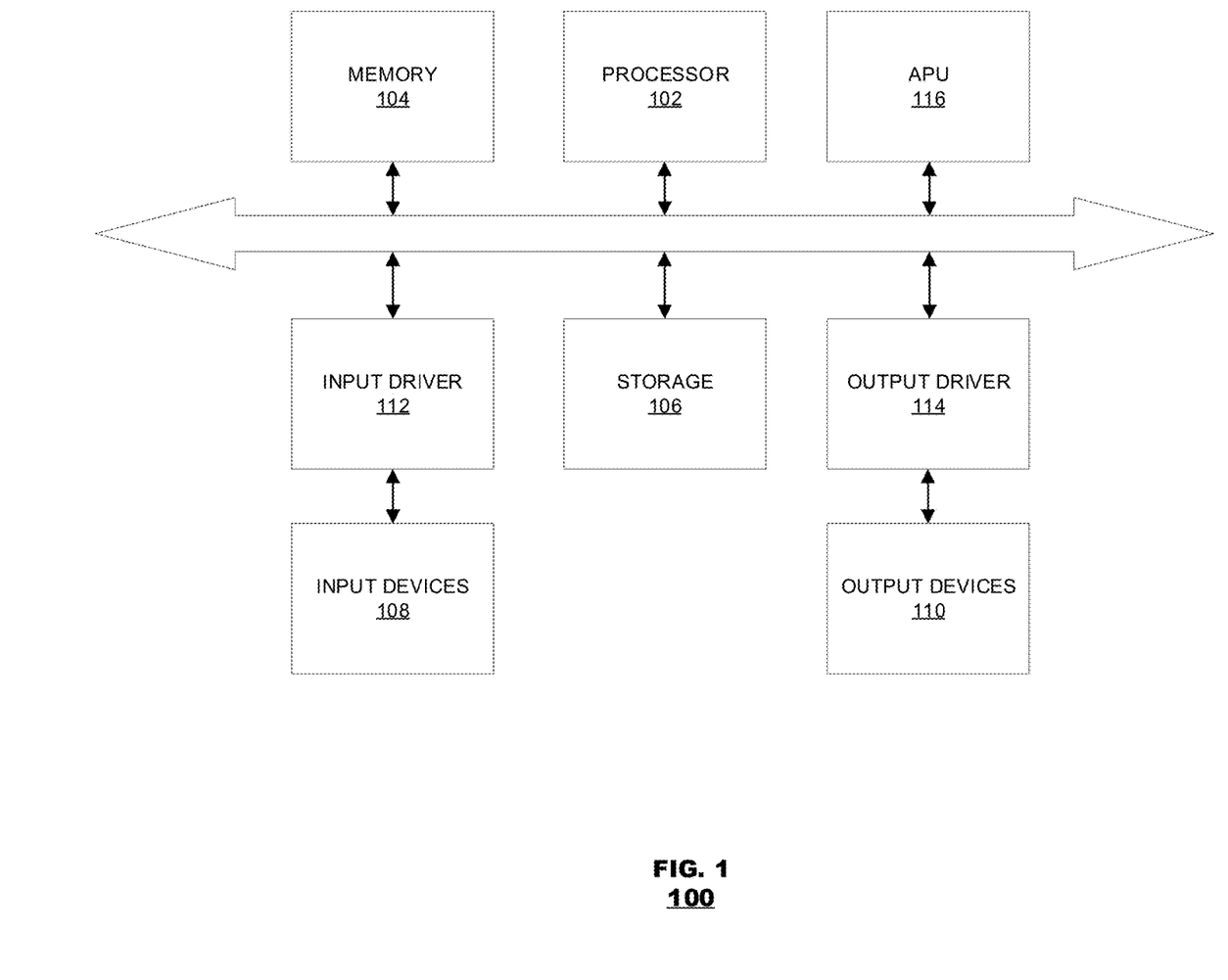
FIG. 1 is a block diagram of an example device, based on which one or more features of the disclosure can be implemented.

FIG. 1 is a block diagram of an example device 100, based on which one or more features of the disclosure can be implemented. The device 100 can be, for example, a computer, a gaming device, a handheld device, a set-top box, a television, a mobile phone, or a tablet computer. The device 100 includes a processor 102, an accelerated processing unit (APU) 116, memory 104, storage 106, one or more input devices 108, and one or more output devices 110. The device 100 can also include an input driver 112 and an output driver 114. In an aspect, the device 100 can include additional components not shown in FIG. 1.

The processor 102 can include a central processing unit (CPU) or one or more cores of CPUs. The APU 116, representing a shader system or graphics processing unit (GPU), can include one or more cores of APUs. The processor 102 and the APU 116 may be located on the same die or on separate dies. The memory 104 can be located on the same die as the processor 102, or can be located separately from the processor 102. The memory 104 can include volatile or non-volatile memory, for example, random access memory (RAM), dynamic RAM, a cache, or a combination thereof.

The storage 106 can include fixed or removable storage, for example, a hard disk drive, a solid-state drive, an optical disk, or a flash drive. The input devices 108 can include, for example, a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output devices 110 can include, for example, a display, a speaker, a printer, a haptic feedback device, one or more lights, an antenna, or a network connection (e.g., a wireless local area network card for transmission of wireless IEEE 802 signals).

The input driver 112 communicates with the processor 102 and the input devices 108, and facilitates the receiving of input from the input devices 108 to the processor 102. The output driver 114 communicates with the processor 102 and the output devices 110, and facilitates the sending of output from the processor 102 to the output devices 110. In an aspect, the input driver 112 and the output driver 114 are optional components, and the device 100 can operate in the same manner when the input driver 112 and the output driver 114 are not present.

The APU 116 can be configured to accept compute commands and graphics rendering commands from processor 102, to process those compute and graphics rendering commands, and/or to provide output to a display (output device 110). The APU 116 can include one or more parallel processing units configured to perform computations, for example, in accordance with a single instruction multiple data (SIMD) paradigm. Thus, although various functionality is described herein as being performed by or in conjunction with the APU 116, in various alternatives, the functionality described as being performed by the APU 116 can be additionally or alternatively performed by other computing devices having similar capabilities that are not driven by a host processor (e.g., processor 102) and that can be configured to provide, for example, graphical output to a display. Whether or not a processing system can perform processing tasks in accordance with a SIMD paradigm, the processing system can be configured to perform the functionality described herein.

Figure 2:
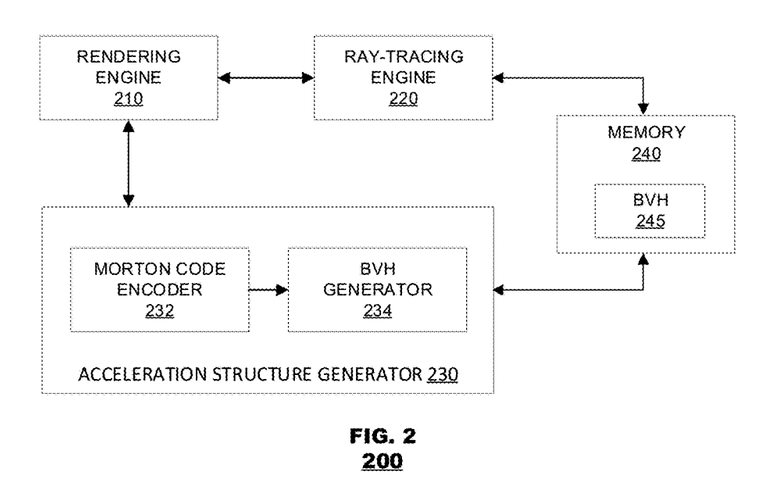
FIG. 2 is a functional block diagram of an example system for graphical rendering, based on which one or more features of the disclosure can be implemented.

FIG. 2 is a functional block diagram of an example system 200 for graphical rendering, based on which one or more features of the disclosure can be implemented. The system 200 includes a rendering engine 210, a ray-tracing engine 220, and an acceleration structure generator 230, including a Morton code encoder 232 and a BVH generator 234. The system's 200 components 210, 220, 230, 232, 234 can be implemented by processing units and/or accelerators (e.g., the processor 102 and the APU 116, shown in FIG. 1). The system 200 also includes a memory 240 (e.g., the memory 104, shown in FIG. 1). The system's 200 components represent functionalities employable in computer graphics for the rendering of objects in a 3D scene. Further, each of the system's 200 components can be implemented in software, hardware, or firmware or a combination thereof. The system 200 is further described in reference to FIG. 3.

Figure 3:
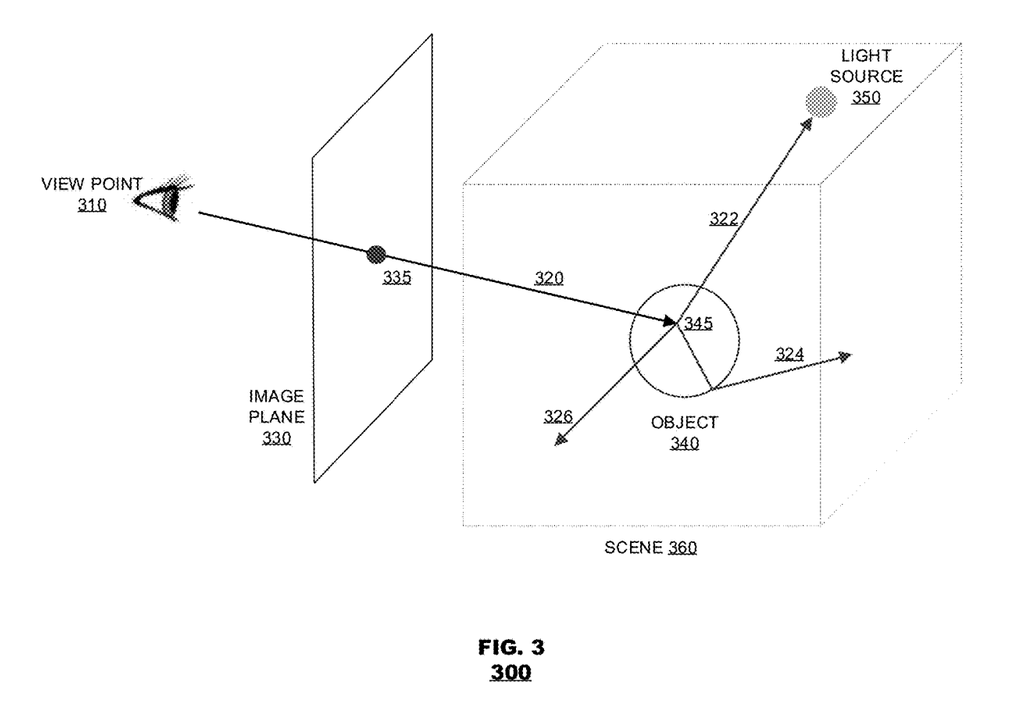
FIG. 3 is a diagram illustrating graphical rendering via ray tracing, based on which one or more features of the disclosure can be implemented.

FIG. 3 is a diagram illustrating graphical rendering via ray tracing 300, based on which one or more features of the disclosure can be implemented. A scene 360 to be rendered may include multiple objects, such as object 340. An object in a scene is typically defined by a 3D representation including primitives, that is, graphical elements such as triangles. These primitives are located at the surface of (and sometimes within) the object and the primitives are each associated with properties, including appearance and physical properties, of the object at their respective locations. Generally, the rendering of an object 340 first involves projecting the object's 3D representation onto an image plane 330. Thus, every pixel's value (e.g., 335) on the image plane 330 is initially determined by a primitive 345 (defined in the scene 360) that is hit by a projection ray 320, starting at a view point 310, as illustrated in FIG. 3. Based on the associated properties of the primitive, the color of the corresponding pixel 335 is initially determined.

The rendering of an image as described above can be employed by the rendering engine 210 based on objects defined in the scene 360, that is, based on primitives that constitute the graphical data of a scene. Thus, given a view point 310 and an image plane 330 (spatially located relative to the scene), the rendering engine 210 generates projection rays (e.g., 320). Each projection ray originates at the view point 310 and crosses the image plane 330 at a pixel location (e.g., 335). To determine the value of each pixel in the image 330, the corresponding projection ray has to be traced to find the intersection point of the ray with a primitive in the scene. For example, as described above, the intersection point 345 of projection ray 320 with a primitive at the surface of object 340 has to be found to determine the color of pixel 335. Thus, the rendering engine 210 can employ the ray-tracing engine 220 to find the ray-intersecting primitive for each of the generated projection rays.

The rendering engine 210 may add special effects in the rendering of an object 340 that may result in a more realistic image 330 of the object. For example, the illumination level at a certain location on the object surface (e.g., 345) may be computed based on the tracing of a secondary ray 322 from that location (e.g., 345) to a source of light 350, to determine, for example, whether another primitive in the scene intersects with the secondary ray, and, so, occludes that light. In another example, it may be desired to render a certain location on the object surface (e.g., 345) as part of a reflective or somewhat transparent surface. In such a case, a secondary ray (a reflection ray 326 or a refraction ray 324) starting at that location (e.g., 345) should be traced to determine the effect on the color of the corresponding pixel (e.g., 335). To render such special effects, the rendering engine 210 can generate these secondary rays and employ the ray-tracing engine 220 to find the ray-intersecting primitive for each of these generated secondary rays.

The ray-tracing engine 220 is employed to trace rays provided to it by the rendering engine 210. To perform ray-tracing in a computationally efficient manner, a ray tracer 220 uses acceleration structures that provide efficient access to primitives in the scene. An example for an accelerator structure is a BVH tree 245. A BVH tree groups the primitives into bounding volumes in various scales, wherein each bounding volume is associated with a node of the BVH tree, and wherein bounding volumes associated with children nodes are spatially confined by the bounding volume associated with the parent node. Given a ray's origin and orientation, the ray-tracing engine 220 can use the BVH tree 245 to find a ray-intersecting primitive, for example, as described in U.S. patent application Ser. No. 17/562,271, filed Dec. 27, 2021, titled "BVH node ordering for efficient ray tracing." Thus, the ray-tracing engine 220 can utilize a BVH tree, generated by the acceleration structure generator 230, stored in memory 240.

The acceleration structure generator 230 may receive from the rendering engine 210 primitives, representative of objects in the scene. The acceleration structure generator 230, then, employs the Morton code encoder 232 and the BVH generator 234 to generate the BVH tree 245. Based on the scene's primitives, the encoder 232 generates respective Morton codes, and based on these Morton codes, the BVH generator 234 constructs the BVH tree. Disclosed herein are techniques for efficiently generating Morton codes.

The encoder 232 encodes vectors, representing 3D locations of primitives in a scene, into corresponding integer scalar numbers, namely Morton codes. These Morton codes can, then, be utilized for spatial clustering of the vectors (primitives) they encode, as two consecutive Morton codes correspond to two vectors that are spatially close. A Morton code of a vector can be computed by interleaving the bits of the vector's elements. For example, the elements of a vector $V=(v_x, v_y, v_z)$, representing a location in a 3D space, are first quantized into integers within a certain range, e.g., $[0, 2^n]$, resulting in $P=(p_x, p_y, p_z)$. Assuming n=8, then the bits of respective elements can be denoted as: $p_x=x_7x_6x_5x_4x_3x_2x_1x_0$, $p_y=y_7y_6y_5y_4y_3y_2y_1y_0$, and $p_z=z_7z_6z_5z_4z_3z_2z_1z_0$. The interleaved number of N=3n=24 bits is:

$$M_P = x_7y_7z_7x_6y_6z_6x_5y_5z_5x_4y_4z_4x_3y_3z_3x_2y_2z_2x_1y_1z_1x_0y_0z_0. \quad (1)$$

That is, the 24-bit Morton code associated with vector $V=(v_x, v_y, v_z)$.

Figure 4:
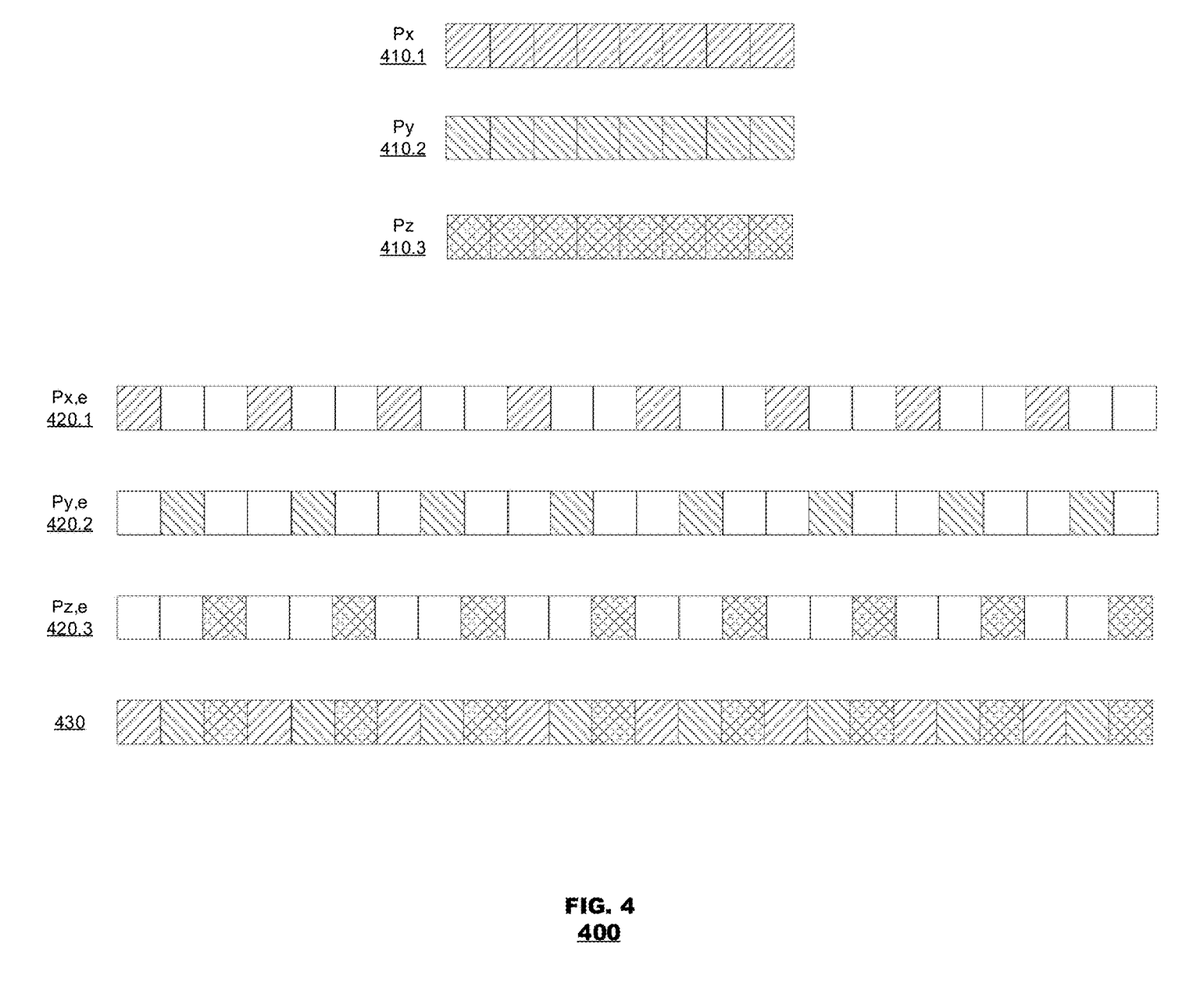
FIG. 4 is a diagram illustrating generation of Morton code, based on which one or more features of the disclosure can be implemented.

FIG. 4 is a diagram illustrating generation of Morton code 400, based on which one or more features of the disclosure can be implemented. FIG. 4 shows the three quantized vector elements $p_x$ 410.1, $p_y$ 410.2, and $p_z$ 410.3. To interleave these vector elements into one 24-bit Morton code, as shown in equation (1), the vector elements 410.1-3 have to be first expanded into respective vector elements $p_{x,e}$ 420.1, $p_{y,e}$ 420.2, and $p_{z,e}$ 420.3, as demonstrated in FIG. 4. The expanded vector elements are then combined into one integer number 430, resulting in the 24-bit Morton code. Generating Morton code, as demonstrated in FIG. 4, can be accomplished efficiently by bitwise operations (e.g., AND, OR, XOR, and shift) that space out the bits of elements $p_x$ 410.1, $p_y$ 410.2, and $p_z$ 410.3 and that shift them relative to each other to allow them to interleave according to the pattern 430 shown in equation (1).

The benefit of using Morton codes to cluster vectors based on their spatial proximity to each other is demonstrated in Table 1. Table 1 shows the 4-bit Morton code $M_P$ of a two-dimensional quantized vector $P=(p_x, p_y)$. As can be seen, consecutive Morton codes, $M_p$, correspond to vectors $P_i$ and $P_j$ that are spatially close to each other. For example, neighboring vectors $P_2=(01,00)$ and $P_6=(01,01)$ correspond to consecutive Morton code values 0010 and 0011.

TABLE 1

4-bit Morton Code.

| | $P_x$ | $P_y$ | $M_p$ |
|---|---|---|---|
| $P_1$ | 00 | 00 | 0000 |
| $P_2$ | 01 | 00 | 0010 |
| $P_3$ | 10 | 00 | 1000 |
| $P_4$ | 11 | 00 | 1010 |
| $P_5$ | 00 | 01 | 0001 |
| $P_6$ | 01 | 01 | 0011 |
| $P_7$ | 10 | 01 | 1001 |
| $P_8$ | 11 | 01 | 1011 |
| $P_9$ | 00 | 10 | 0100 |
| $P_{10}$ | 01 | 10 | 0110 |
| $P_{11}$ | 10 | 10 | 1100 |
| $P_{12}$ | 11 | 10 | 1110 |
| $P_{13}$ | 00 | 11 | 0101 |
| $P_{14}$ | 01 | 11 | 0111 |
| $P_{15}$ | 10 | 11 | 1101 |
| $P_{16}$ | 11 | 11 | 1111 |

A common application of Morton code is for multi-scale clustering of primitives in a scene to be rendered. As explained above, the ray-tracing engine 220 uses acceleration structures, such as the BVH tree 245, to efficiently search for graphical primitives that intersect given rays. The BVH tree 245, in turn, can be constructed by the BVH generator 234 based on Morton codes. These Morton codes, encoded by the Morton code encoder 232, encode the scene's primitives. Since Morton codes implicitly encode the relative spatial locations of points in space, they are instrumental in spatially clustering the primitives they encodes.

Primitives of a scene can be clustered, in a multi-scale fashion, by encoding the primitives' locations (e.g., as represented by their centroids) into respective Morton codes, and, then, by sorting these Morton codes. The clusters' boundaries are delineated by a bit value change in a Morton code. For example, all primitives with respective Morton codes with a most significant bit equal to one are assigned to a first cluster while all primitives with respective Morton codes with a most significant bit equal to zero are assigned to a second cluster. Next, out of the primitives that belong to the first cluster, all primitives with respective Morton codes with a second most significant bit equal to one are assigned to a first cluster (within the first cluster) and all primitives with respective Morton codes with a second most significant bit equal to zero are assigned to a second cluster (within the first cluster), as further described in reference to FIG. 5.

Figure 5:
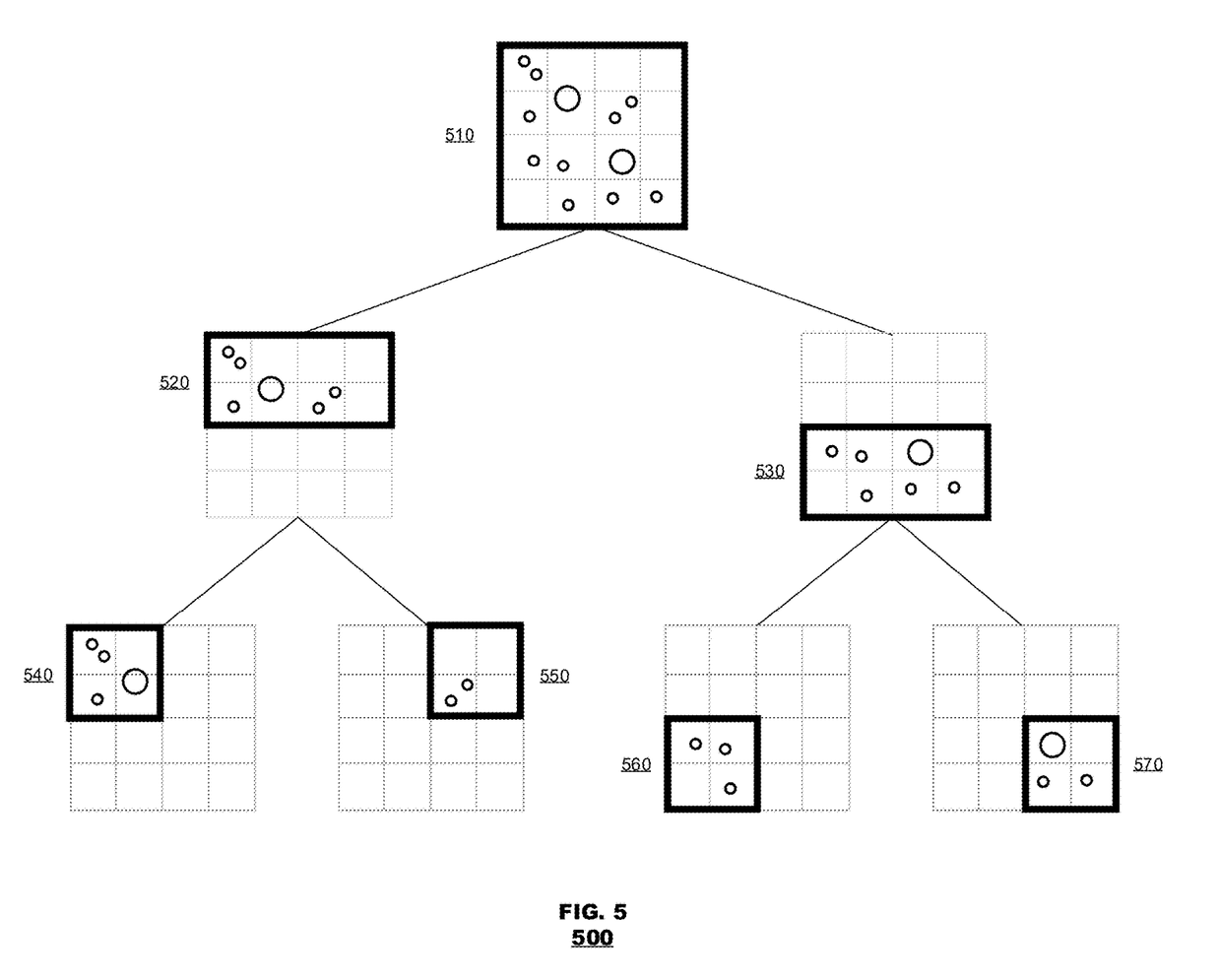
FIG. 5 is a diagram illustrating utilization of Morton codes for recursively subdividing primitives into clusters, based on which one or more features of the disclosure can be implemented.

FIG. 5 is a diagram illustrating utilization of Morton codes for recursively subdividing primitives into clusters 500, based on which one or more features of the disclosure can be implemented. FIG. 5 demonstrates the clustering of 12 quantized primitives (denoted by circles), $P=(p_x, p_y)$, into clusters at different scales according to an example 4-bit Morton code: $x_1y_1x_0y_0$. At the top scale (scale zero) all the primitives are clustered into one box that bounds the scene, that is, the scene's box 510. Then, primitives are divided into two clusters 520 and 530, so that primitives with $x_1=0$ are clustered into cluster 520 and primitives with $x_1=1$ are clustered into cluster 530. Then, primitives are divided into two clusters 540 and 550 that branch from cluster 520 and into two clusters 560 and 570 that branch from cluster 530. Accordingly, primitives with $x_1y_1=00$ are clustered into cluster 540, primitives with $x_1y_1=01$ are clustered into cluster 550, primitives with $x_1y_1=10$ are clustered into cluster 560, and primitives with $x_1y_1=11$ are clustered into cluster 570. Clusters 540, 550, 560, and 570, are at one scale below the top scale, that is, scale one. Clustering at lower scales can be continued in the same manner based on the values of code bits $x_0y_0$. Generalizing to the 3D case shown in equation (1), starting from the most significant bit triplet, each triplet in the Morton code selects an octree subdivision. Thus, each triplet $x_iy_iz_i$ in the code selects one of eight sub-volumes and are associated with a scale corresponding to i. Each of the eight sub-volumes has a diagonal that is equal to half of the diagonal of the volume it was divided from. For example, the triplet $x_7y_7z_7$ selects one of the eight sub-volumes divided from the volume that encloses the scene (that corresponds to scale zero). The eight sub-volumes correspond to scale one. Similarly, the triplet $x_6y_6z_6$ selects one of the eight sub-volumes of the sub-volume selected by the triplet $x_7y_7z_7$, and so forth.

Hence, a Morton code can be used to divide a large number of primitives into clusters at different scales based on the primitives' locations (centroids). Generally, to generate a BVH tree out of such clustering, primitives in each cluster at each scale are bounded by a respective bounding volume, so that volumes at one scale (e.g., the two boxes that bound the primitives in clusters 540 and 550) are enclosed by the volume at the higher scale (e.g., the box that bounds the primitives in cluster 520). However, to generate a high quality BVH tree, overlaps among the volumes should be minimized. Overlaps may occur when primitives of larger size are clustered with primitives of a smaller size. As explained above, the clustering of primitives is performed with respect to their centroids. However, primitives of a scene are typically of different sizes. Therefore, when clustering primitives based on their centroids, it may be that smaller primitives are clustered with larger primitives, and though their centroids are closed, the larger primitives enforce a large common bounding box in several scales of clusters. Therefore, separating these larger primitives, at the right scale can prevent (or reduce) overlap among bounding volumes and thereby improve the quality of the BVH tree.

To improve the clustering of primitives of various sizes, it was proposed to add into the Morton code, in addition to the primitive's location $P=(p_x, p_y, p_z)$, the primitive's size, s, as follows:

$$\hat{M}_P = x_7 y_7 z_7 s_7 x_6 y_6 z_6 s_6 x_5 y_5 z_5 s_5 x_4 y_4 z_4 s_4 x_3 y_3 z_3 s_3 x_2 y_2 z_2 s_2 x_1 y_1 z_1 s_1 x_0 y_0 z_0 s_0. \quad (2)$$

Thus, $\hat{M}_P$ is a 32-bit (extended) Morton code that encodes the size of a primitive in addition to its location in space. The size of a primitive s can be encoded using the same number of bits as $(p_x, p_y, p_z)$, as shown in equation (2). Alternatively, the size of a primitive s can be encoded using fewer bits. That is, the bits of s may be interleaved into the bits of $(p_x, p_y, p_z)$ every $m^{th}$ number of bits. For example, the bits of s can be interleaved into the bits of $(p_x, p_y, p_z)$ every 7th number bits, as follows:

$$\hat{M}_P = x_7 y_7 z_7 x_6 y_6 z_6 s_3 x_5 y_5 z_5 x_4 y_4 z_4 s_2 x_3 y_3 z_3 x_2 y_2 z_2 s_1 x_1 y_1 z_1 x_0 y_0 z_0 s_0, \quad (3)$$

The size of the primitive s can be determined by using different metrics, such as a surface area of the bounding volume that encloses the primitive or a diagonal length of the bounding volume that encloses the primitive. As proposed by Vinkler, the size of the primitive can be normalized by dividing the size of the primitive by the size of the scene. A new size metric, $S_m$, including an improved method of normalization, is disclosed herein, as follows:

$$S_m = \left(S(g_i) - \min_{j=1-M} S(g_j)\right) / \left(\max_{j=1-M} S(g_i) - \min_{j=1-M} S(g_j)\right). \quad (4)$$

Where, $S(g_i)$ is the size of a primitive $$g_i. \min_{j=1-M} S(g_j)$$

is the minimal size across all M primitives and $$\max_{j=1-M} S(g_i)$$

is the maximal size across all M primitives. Wherein, for example, a size of a primitive can be the length of a diagonal of the volume that bounds the primitive or the surface area of the volume that bounds the primitive. Note that the size metric, as defined in equation (4), does not use the size of the volume that bounds the scene, leading to a higher quality clustering of the primitives based on the resulting Morton code.

Often, primitives that represent a scene 360 are not enclosed in a cubical volume, but may extend in one dimension (e.g., the horizontal direction) beyond another dimension (e.g., the vertical dimension). For example, a scene portraying a landscape may have primitives that are distributed along two dimensions (e.g., the x and the y dimensions), so that the x and y dimensions of the scene's volume are much larger than the z (vertical) dimension of the scene's volume. In such a case, instead of dividing the scene's volume according to triplets of $x_i y_i z_i$, based on a regular pattern of Morton code, as in equations (1) and (2), the pattern of the Morton code can be determined based on the relative sizes among the dimensions of the sub-divided volumes. When the resulting pattern is not a regular pattern, such a pattern should be recorded and referred to when computing the Morton code of each primitive. To that end, an array A that contains indexes corresponding to the axis to be divided can be maintained. Thus, looping through the N bits of a Morton code, starting from the most significant bit: 1) A(0) is set to the largest dimension of the scene's volume (e.g., if that largest dimension is the x dimension, then A(0)=0) and 2) that dimension is divided by two. Next, with respect to the second most significant bit: 1) A(1) is set to the largest dimension (e.g., if that largest dimension is the z dimension, then A(1)=2) and 2) that largest dimension is divided by two; and so on. When looping through the bits of a Morton code, the size bits may be indexed every $m^{th}$ bit (e.g., A(m)=3). Then, based on the indexes recorded in A, divisions of the scene's volume will be performed, where index 0 indicates division along the x dimension, index 1 indicates division along the y dimension, index 2 indicates division along the z dimension, and index 3 indicates a size bit. (See Vinkler). In contrast to the regular pattern of the Morton code (shown in equations (1) and (2)), the resulting Morton code has an irregular (or adaptive) pattern that uses irregular bit interleaving, recorded in the array of indexes, as described above. Such an irregular pattern, though deviates from the original Morton code, still provides for a bit-based subdivision of primitives, based on which a BVH tree can be constructed.

Dividing the scene volume based on the relative dimension sizes of the subdivisions of a scene's volume typically results in a pattern that deviates from the regular pattern of a Morton code only in the first few bits of the code—the rest of the code contains regular triplets (or quadruples in the case of an injected size bit). This is because as soon as the divided volumes approach a cube (e.g., no dimension is twice as large as any other dimension), selecting the largest dimension to divide will produce a regular subdivision pattern. Therefore, partitioning the pattern of the Morton code into a prefix pattern (an irregular part of the pattern) and base pattern (the regular part of the pattern) and using a predetermined prefix pattern may be more efficient, avoiding the need to execute two sequential loops: one loop to compute A and another loop to interleave a location vector according to the pattern indexed in A, as proposed by Vinkler.

An alternative method for determining the pattern of a Morton code is disclosed herein, that does not require a sequential loop to compute A. Thus, for example, if the x dimension of the scene is larger than the y dimension of the scene and the y dimension of the scene is larger than the z dimension of the scene, then before dividing the scene' volume according to triplets of $x_i y_i z_i$, as explained above, a better clustering can be achieved by first dividing the scene' volume in the x dimension a number of $n_x$ times until the x dimension of the divided sub-volumes reaches a size that is closer to the y dimension. At that point, division can proceed in both x and y dimensions $n_{xy}$ times until the x, y, and z dimensions of the divided sub-volumes are approximately the same. At that point, the division can proceed in all three dimensions x, y, and z.

For example, for $n_x=3$ and $n_{xy}=3$, a Morton code pattern may be as follows:

$$M_P = x_{11} x_{10} x_9 x_8 y_8 x_7 y_7 x_6 y_6 x_5 y_5 z_5 x_4 y_4 z_4 x_3 y_3 z_3 x_2 y_2 z_2 x_1 y_1 z_1 x_0 y_0 z_0. \quad (5)$$

where, $x_{11} x_{10} x_9$ corresponds to $n_x=3$ divisions in the x dimension, $x_8 y_8 x_7 y_7 x_6 y_6$ corresponds to $n_{xy}=3$ divisions in the x and y dimensions, and $x_5y_5z_5x_4y_4z_4x_3y_3z_3x_2y_2z_2x_1y_1z_1x_0y_0z_0$ corresponds to a regular division in all dimensions. The first part of the code pattern, $x_{11}x_{10}x_9x_8y_8x_7y_7x_6y_6$, is referred to herein as a prefix pattern and the second part of the code pattern, $x_5y_5z_5x_4y_4z_4x_3y_3z_3x_2y_2z_2x_1y_1z_1x_0y_0z_0$, is referred to herein as a base pattern. The Morton code according to these patterns contains 27 bits-12 bits are assigned to the x axis, 9 bits are assigned to the y axis, and 6 bits are assigned to the z axis. Accordingly, when quantizing the location vector of each primitive, vector $V=(v_x, v_y, v_z)$, $v_x, v_y, v_z$ should each be quantized within respective ranges of $[0, 2^{12}]$, $[0, 2^9]$, $[0, 2^6]$ to result in $P=(p_x, p_y, p_z)$.

Figure 6:
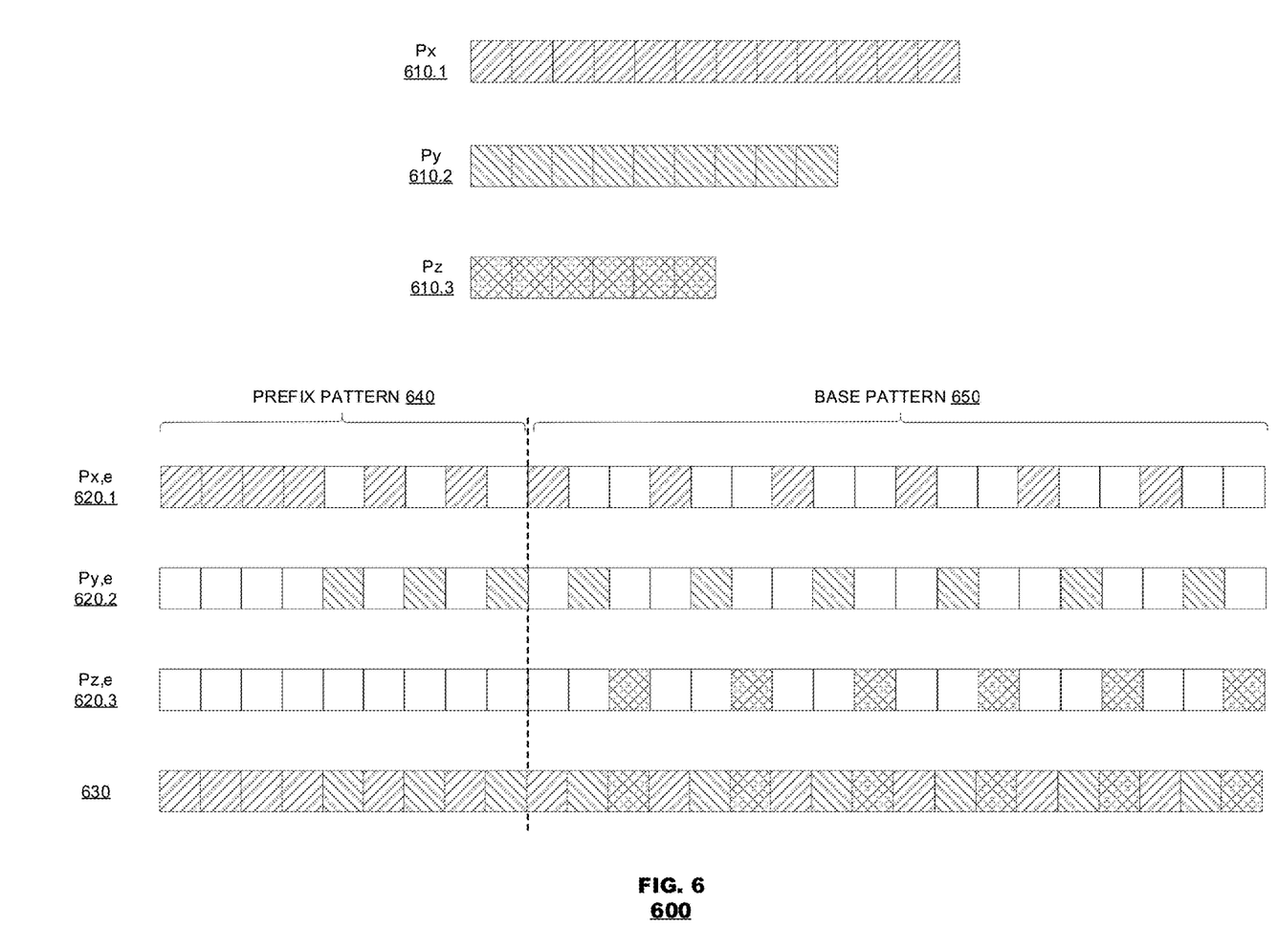
FIG. 6 is a diagram illustrating generation of Morton code, containing a prefix pattern and a base pattern, based on which one or more features of the disclosure can be implemented.

FIG. 6 is a diagram illustrating generation of Morton code, containing a prefix pattern and a base pattern 600, based on which one or more features of the disclosure can be implemented. Assuming a prefix pattern is determined to contain $x_{11}x_{10}x_9$, corresponding to $n_x=3$ divisions in the x dimension, and $x_8y_8x_7y_7x_6y_6$, corresponding to $n_{xy}=3$ divisions in both the x and y dimensions, as in equation (5). And, assuming a base pattern 650 is determined to contain 6 triplets of $x_iy_iz_i$. The resulting 27-bit Morton code contains –12 bits that are assigned to the x axis 610.1, 9 bits that are assigned to the y axis 610.2, and 6 bits that are assigned to the z axis 610.3. To interleave the quantized vector elements $p_x$ 610.1, $p_y$ 610.2, and $p_z$ 610.3 into one 27-bit Morton code, as demonstrated in equation (5), the vector elements 610.1-3 have to be first expanded into respective vector elements $p_{x,e}$ 620.1, $p_{y,e}$ 620.2, and $p_{z,e}$ 620.3, as shown in FIG. 6. The expanded vector elements are then combined into one integer number 630, resulting in the 27-bit Morton code. Generating Morton code, as demonstrated in FIG. 6, can be accomplished efficiently by bitwise operations (e.g., AND, OR, XOR, and shift) that space out the bits of elements $p_x$ 610.1, $p_y$ 610.2, and $p_z$ 610.3 and that shift them relative to each other to allow them to interleave according to the prefix pattern 640 and the base pattern 650, as demonstrated in equation (5).

In an aspect, the prefix pattern is determined by:

$$n_x = \log_2(D_1/D_2), \quad (6)$$

$$n_{xy} = \log_2(D_2/D_3), \quad (7)$$

Where, $D_1$ denotes the largest dimension of the scene's volume, $D_2$ denotes the second largest dimension of the scene's volume, and $D_3$ denotes the smallest dimension of the scene's volume. That is, the number of divisions along the largest dimension (in our example the x dimension) is proportional to the ratio between the largest dimension and the second largest dimension, according to $\log_2(D_1/D_2)$. If $D1=D2$, $n_x=0$, and the prefix pattern will not include division along the x dimension only. Likewise, the number of divisions along the largest dimension and the second largest dimension (in our example the x and the y dimensions) is proportional to the ratio between the second largest dimension and the smallest dimension, according to $\log_2(D_2/D_3)$. If $D_2=D_3$, $n_{xy}=0$, and the prefix pattern will not include consecutive divisions along the x and the y dimensions only. In the case, where $D_1=D_2=D_3$, no prefix pattern is necessary, as the scene is a cube.

In yet another aspect, two variation may be defined for the Morton code based on the result for $n_x$ and $n_{xy}$, resulting in a first pattern and a second pattern. For example, assuming that equations (6) and (7) result in $n_x=3$ and $n_{xy}=3$, respectively. And, assuming a 28-bit Morton code is desired. Then, the first pattern can be defined as starting with a prefix pattern of xxx, xy, xy, xy, and x, followed by triplets of yxz, for example, as follows:

$$M_P(q=1) = x_{12}x_{11}x_{10}x_9y_8x_8y_7x_7y_6x_6y_5x_5z_5 \\ y_4x_4z_4y_3x_3z_3y_2x_2z_2y_1x_1 \\ z_1y_0x_0z_0, \quad (8)$$

The second pattern can be defined as starting with a prefix pattern of xxx, xy, xy, and xy, followed by triplets of xyz, and ending with a single x bit, for example, as follows:

$$M_P(q=0) = x_{12}x_{11}x_{10}x_9y_8x_8y_7x_7y_6x_6y_5z_5x_5y_4z_4x_4 \\ y_3z_3x_3y_2z_2x_2y_1z_1x_1y_0z_0x_0. \quad (9)$$

The selection between the first and the second patterns, can be determined by:

$$q = \log_2(D_1/D_3) - n_x - n_{xy} \quad (10)$$

That is, q can be zero or above zero as a function of the ratio between the smallest dimension and the largest dimension of the scene's volume, according to $\log_2(D_1/D_3)$ minus the results for $n_x$ and $n_{xy}$. Notice, that if $D_1=D_2=D_3$, q is zero, and, thus, the pattern in equation (9) is selected. However, that pattern will not include a prefix pattern, as in this case, the scene is a cube.

Assuming, as before, that the largest dimension of the scene's volume is found to be along the x-axis and the second largest dimension of the scene's volume is found to be along the y-axis, Morton codes can be generated based on the respective code patterns in equations (8) and (9). Since the Morton code contains 28 bits (13 bits are assigned to the x-axis, 9 bits are assigned to the y-axis, and 6 bits are assigned to the z-axis), when quantizing the location vector of each primitive, vector $V=(v_x, v_y, v_z)$, $v_x, v_y, v_z$ should each be quantized within respective ranges of $[0, 2^{13}]$, $[0, 2^9]$, $[0, 2^6]$, resulting in $P=(p_x, p_y, p_z)$. To encode $P=(p_x, p_y, p_z)$ into a Morton code, bits from the x, y, and z dimensions have to be interleaved according to the first or second patterns. To that end, code examples for bitwise interleaving of two numbers and three numbers can be found in https://fgiesen.wordpress.com/2009/12/13/decoding-morton-codes/for Expand functions.

Thus, to encode $P=(p_x, p_y, p_z)$ based on the first pattern, a first part of the Morton code is generated based on the prefix pattern of the first pattern, and, then, a second part of the Morton code is generated based on the base pattern of the first pattern. Accordingly, if $n_x>0$, then the $n_x$ most significant bits of $p_x$ are used for the first part of the Morton code. Next, if $n_{xy}>0$, then the next $n_{xy}$ most significant bits of $p_x$ and the $n_{xy}$ most significant bits of $p_y$ are interleaved. The interleaved bits are added to the first part of the Morton code. Then, the next most significant bit of $p_x$ is added to the end of the first part of the Morton code. The second part of the Morton code is generated by interleaving the remaining bits from $P=(p_x, p_y, p_z)$ according to the base pattern of the first pattern in equation (8):

$$y_5x_5z_5y_4x_4z_4y_3x_3z_3y_2x_2z_2y_1x_1z_1y_0x_0z_0.$$

Similarly, to encode $P=(p_x, p_y, p_z)$ based on the second pattern, a first part of the Morton code is generated based on the prefix pattern of the second pattern, and, then, a second part of the Morton code is generated based on the base pattern of the second pattern. Accordingly, if $n_x>0$, then the $n_x$ most significant bits of $p_x$ are used for the first part of the Morton code. Next, if $n_{xy}>0$, then the next $n_{xy}$ most significant bits of $p_x$ and the $n_{xy}$ most significant bits of $p_y$ are interleaved. The interleaved bits are added to the first part of the Morton code. The second part of the Morton code is generated by interleaving the remaining bits from $P_{q=0}=(p_x, p_y, p_z)$, according to the base pattern of the second pattern in equation (9):

$$x_6y_5z_5x_5y_4z_4x_4y_3z_3x_3y_2z_2x_2y_1z_1x_1y_0z_0x_0.$$

Figure 7:
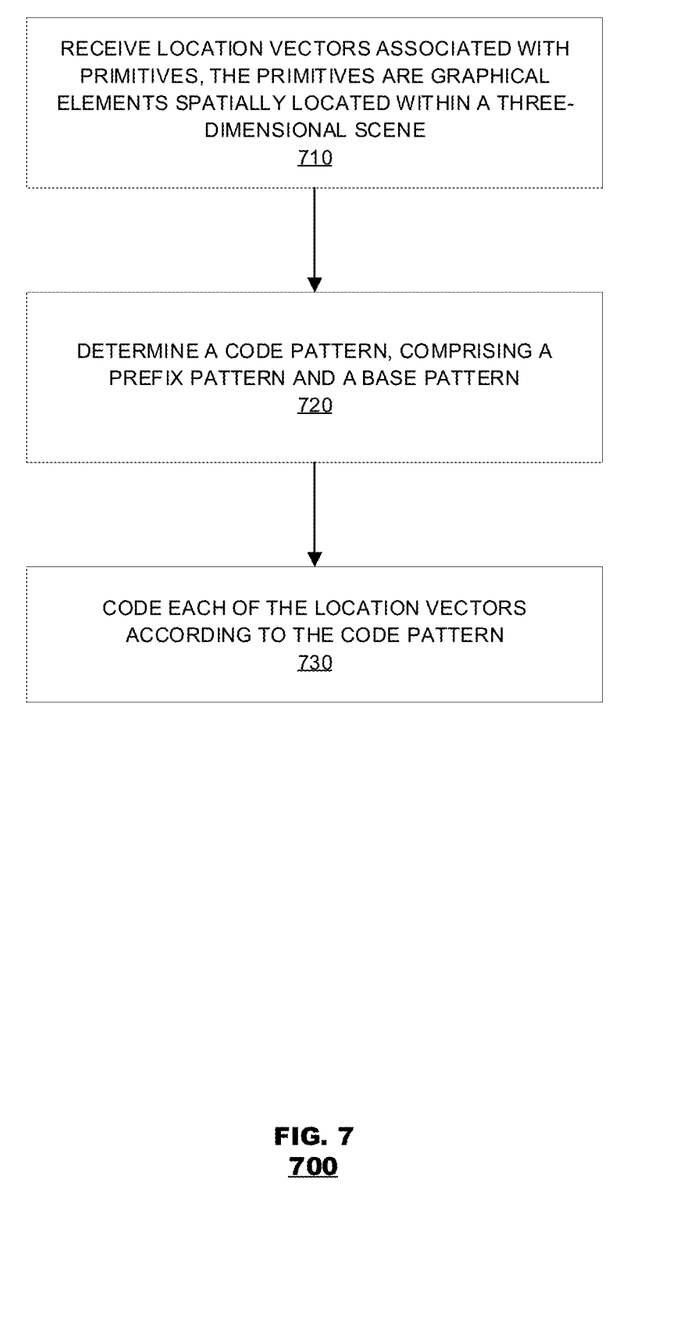
FIG. 7 is a flowchart of an example method for encoding a variable Morton code, based on which one or more features of the disclosure can be implemented.

FIG. 7 is a flowchart of an example method for encoding a Morton code 700, based on which one or more features of the disclosure can be implemented. The method 700 begins with step 710, where location vectors associated with primitives are received. The primitives are graphical elements spatially located within a 3D scene to be rendered by the system described in reference to FIG. 2. In step 720, a code pattern is determined. The code pattern includes a prefix pattern and a base pattern. Then, in step 730, each of the location vectors is coded, according to the code pattern. As described in detail above, the prefix pattern can be indicative of a first number of divisions, according to which the largest dimension of a volume encompassing the scene is divided. The first number of divisions can be determined based on the ratio between the largest dimension and the second largest dimension of the volume encompassing the scene. Further, the prefix pattern can be indicative of a second number of divisions, according to which the largest dimension and the second largest dimension of a volume encompassing the scene is further divided consecutively. The second number of divisions can be determined based on the ratio between the second largest dimension and the smallest dimension of the volume encompassing the scene. In an aspect, the prefix pattern is selected out of a first prefix pattern and a second prefix pattern based on ratios between the largest dimension and the second largest dimension, the second largest dimension and the smallest dimension, and the largest dimension and the smallest dimension.

The method 700 can further insert into the code of a location vector a size metric of a respective primitive, wherein the size metric is determined based on a ratio between a first difference between a size of the primitive and a minimum size of the primitives in the scene and a second difference between a maximum size and the minimum size of the primitives in the scene (see equation (4)). As mentioned above, a size of a primitive can be, for example, a diagonal of the volume that bounds the primitive or the surface of the volume that bounds the primitive.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor. Examples of non-transitory computer-readable storage mediums include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for encoding a Morton code, by an encoder, comprising:
   receiving location vectors associated with primitives, the primitives are graphical elements spatially located within a three-dimensional (3D) scene;
   determining a code pattern comprising a prefix pattern and a base pattern; and
   coding each of the location vectors according to the code pattern.

2. The method of claim 1, wherein the prefix pattern is indicative of a first number of divisions, according to which the largest dimension of a volume encompassing the scene is divided.

3. The method of claim 2, wherein the first number of divisions is determined based on a ratio between the largest dimension and a second largest dimension of the volume encompassing the scene.

4. The method of claim 2, wherein the prefix pattern is further indicative of a second number of divisions, according to which the largest dimension and a second largest dimension of the volume encompassing the scene is further divided consecutively.

5. The method of claim 4, wherein the second number of divisions is determined based on a ratio between a second largest dimension and the smallest dimension of the volume encompassing the scene.

6. The method of claim 1, wherein the prefix pattern is selected out of a first prefix pattern and a second prefix pattern based on ratios between the largest dimension and a second largest dimension, the second largest dimension and the smallest dimension, and the largest dimension and the smallest dimension.

7. The method of claim 1, wherein the coding of each of the location vectors according to the code pattern further comprises:
   inserting into the code of a location vector a size metric of a respective primitive, wherein the size metric is determined based on a ratio between a first difference between a size of the primitive and a minimum size of the primitives in the scene and a second difference between a maximum size and the minimum size of the primitives in the scene.

8. The method of claim 7, wherein a size of a primitive is a diagonal of a volume that bounds the primitive.

9. The method of claim 7, wherein a size of a primitive is a surface of a volume that bounds the primitive.

10. A system for encoding a Morton code, comprising:
    at least one processor; and
    memory storing instructions that, when executed by the at least one processor, cause the system to:
    receive location vectors associated with primitives, the primitives are graphical elements spatially located within a 3D scene,
    determine a code pattern comprising a prefix pattern and a base pattern, and code each of the location vectors according to the code pattern.

11. The system of claim 10, wherein the prefix pattern is indicative of a first number of divisions, according to which the largest dimension of a volume encompassing the scene is divided.

12. The system of claim 11, wherein the first number of divisions is determined based on a ratio between the largest dimension and a second largest dimension of the volume encompassing the scene.

13. The system of claim 11, wherein the prefix pattern is further indicative of a second number of divisions, according to which the largest dimension and a second largest dimension of the volume encompassing the scene is further divided consecutively.

14. The system of claim 13, wherein the second number of divisions is determined based on a ratio between a second largest dimension and the smallest dimension of the volume encompassing the scene.

15. The system of claim 10, wherein the prefix pattern is selected out of a first prefix pattern and a second prefix pattern based on ratios between the largest dimension and a second largest dimension, the second largest dimension and the smallest dimension, and the largest dimension and the smallest dimension.

16. A non-transitory computer-readable medium comprising instructions executable by at least one processor to perform a method for encoding a Morton code by an encoder, the method comprising:
receiving location vectors associated with primitives, the primitives are graphical elements spatially located within a 3D scene;
determining a code pattern comprising a prefix pattern and a base pattern; and
coding each of the location vectors according to the code pattern.

17. The non-transitory computer-readable medium of claim 16, wherein the prefix pattern is indicative of a first number of divisions, according to which the largest dimension of a volume encompassing the scene is divided.

18. The non-transitory computer-readable medium of claim 17, wherein the first number of divisions is determined based on a ratio between the largest dimension and a second largest dimension of the volume encompassing the scene.

19. The non-transitory computer-readable medium of claim 17, wherein the prefix pattern is further indicative of a second number of divisions, according to which the largest dimension and a second largest dimension of the volume encompassing the scene is further divided consecutively.

20. The non-transitory computer-readable medium of claim 19, wherein the second number of divisions is determined based on a ratio between a second largest dimension and the smallest dimension of the volume encompassing the scene.

* * * * *